A. GUMMER.
Vehicle-Spring.
No. 213,748. Patented April 1, 1879.
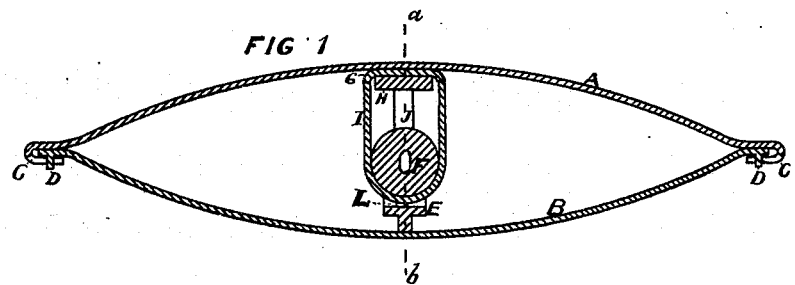
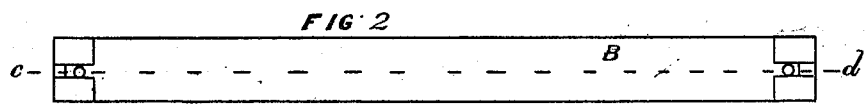
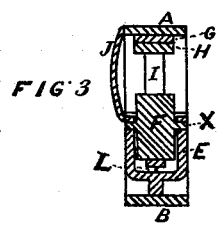
Witnesses
Albert Gummer
Inventor

UNITED STATES PATENT OFFICE.

ALBERT GUMMER, OF OMRO, WISCONSIN.

IMPROVEMENT IN VEHICLE-SPRINGS.

Specification forming part of Letters Patent No. 213,748, dated April 1, 1879; application filed August 16, 1878.

*To all whom it may concern:*

Be it known that I, ALBERT GUMMER, of Omro, Winnebago county, Wisconsin, have invented certain Improvements in Vehicle-Springs, of which the following is a specification:

The nature of my invention relates to the use, in a vehicle-spring, of a forked stud supporting a circular bearing, and an elastic saddle, to prevent severe concussion of the parts coming together under a load, and also a stay-chain or band to prevent the rebound.

Figure 1 is a section of the device on the line $c\,d$. Fig. 2 is a plan, and Fig. 3 is a section on $a\,b$.

A is the upper half of the spring, and B the lower half, joined at the ends by a pin, D, and slot C. E is a forked stud or staple within or under the spring, the ears of which furnish bearings for an elastic circular bearing, F, in which an elongated or a round hole is made in the center, so that it may rest either on the center-pin X, or on the bottom of the fork of the stud E. In the latter case the pin L, or its equivalent, enters the bearing to keep it from turning around. Under and around this bearing passes the cord or band I, attached to the upper half of the spring by a plate, G. This is to prevent too great a rebound of the vehicle-body.

J is a similar band, fastened to the forked stud and upper half of the spring. Either or both of these bands, or their equivalents, may be used.

H is an elastic saddle, which meets the circular bearing F when under pressure.

I claim—

In a vehicle-spring, A B, the combination of the forked stud E, the cylindrical bearing F, the elastic saddles H, and stay-band I or J, substantially as shown and described.

ALBERT GUMMER.

Witnesses:
J. H. CASWELL,
R. WEBB.